Patented Oct. 20, 1931

1,828,518

UNITED STATES PATENT OFFICE

ANSEL S. WYSONG, OF LOS ANGELES, CALIFORNIA, ASSIGNOR OF ONE-HALF TO CHARLES H. POPENOE, OF SILVER SPRING, MARYLAND

PROCESS FOR THE PRESERVATION OF FRESH FRUITS AND VEGETABLES FROM MOLD AND DECAY

No Drawing. Application filed April 2, 1930. Serial No. 441,173.

This invention relates to the control of the numerous rots and molds which attack and destroy or damage fruits and vegetables during their storage, transportation, and exposure for sale. It has for its object the combination of suitable chemicals having varied characteristics into a solution capable of destroying or inhibiting the growth of lower plant organisms and their spores when inoculated upon or within fruits and vegetables before such storage or transportation, and the penetration of such chemical composition into and through the external natural protective covering of fruits and vegetables, or into cuts, abrasions and breaks in the same, by means of electric endosmose, cataphoresis, or absorption, whereby the growth of parasitic inocula may be prevented, without damage to the food product or injury to the consumer. Herein, the term "wetting agent" is defined as any chemical substance which may be used to reduce the surface tension of the preservative solution, or to dissolve from the plant micro-organism any protective or repellent coating which might prevent the penetration and action of the fungicide. To the accomplishment of the foregoing and related ends, said invention, then, consists of the means hereinafter described and particularly pointed out in the claims.

The following description sets forth in detail one application of the process exemplifying my invention, such disclosed procedure and process constituting, however, but one of various applications of the principles of my invention.

At the present time severe losses are inflicted upon the producer and shipper of fruits and vegetables through the prevalence of various molds and rots which gain entrance into cuts and abrasions occasioned to such fruits and vegetables by handling and processing during gathering and packing. Under favorable conditions the spores grow and multiply rapidly, causing the breaking down of the fruit structure and incident changes in flavor and appearance which render the fruit unmarketable. Various processes have been applied unsuccessfully to the control of these losses, but, due to the fact that molds in particular are not readily susceptible of control by the usual fungicides, and moreover, because the threads and spores of the mold repel most water solutions, material control has not been heretofore accomplished. Softened areas beneath the epidermis of the fruit carry the infection within and away from the influence of common fungicides. A means of carrying the fungicidal solution within the fruit is therefore necessary. It is elemental that electric currents or charges of suitable type are capable of carrying with them both chemical ions and compounds through a permeable membrane, and that chemically the cell walls of plants are capable of osmose, and are therefore permeable. It is further well known that certain iron compounds inhibit the growth of non-chlorophyll bearing plants. This is often exemplified by the failure of mushroom spawn to grow near a wire or nail in the compost of the bed. Extensive experimentation has shown me that these principles can be applied to the control of fruit molds and rots.

I have discovered that ferrous sulphate destroys the spores and threads of the molds attacking fruits, if applied in a solution which thoroughly wets the mold plant and that the solution is capable of being projected into the substance of the fruit by means of an electric current of sufficient potential to overcome the resistance of the fruit. Infections which have progressed for several days may thus be reached and destroyed, particularly since the electrical conductivity of tissues attacked by the mold is thereby increased. The preservative fluid which I prefer at present to use is composed of one part ferrous sulphate, four parts commercial sulphuric acid, four parts normal butyl alcohol and 120 parts water. This has been successfully injected by a direct current of 110 volts and by a unidirectional high frequency induced current. It is not at present clear whether electric endosmose or cataphoresis accomplishes this injection through the permeable fruit membranes, or whether the compounds present in the solution, or ions derived therefrom through the electric treatment of the solution, are responsible for inhibiting growth of the molds, but these questions have no immediate bearing on the practical application of the process.

In view of the fact that the threads and spores of blue and green molds are repellent to a water solution of a mineral salt, I secure adequate penetration of the solution into the mold organism by adding a chemical which is water-soluble, and which has the property of reducing the surface tension of the water solution to a substantial degree, also dissolving the protective repellent coating of the mold. In the preferred mixture, normal butyl alcohol accomplishes this, although other chemical agents of similar characteristics may be substituted. I have also found that a solution of ferrous sulphate, when applied to abrasions in the integument of citrus fruits, combines with certain tannins in the integument to form dark colored tannates or gallates which may disfigure the the fruit. I have found that this combination may be prevented by the acidulation of the preservative solution, a substantial excess of acid ions acting as a buffer to such discoloration. In the presence of ferrous sulphate, the preferred acid is sulphuric acid, although the most suitable acid buffer would of course be governed by the solution employed. Similar compounds employing copper and other fungicidal salts, water soluble aliphatic alcohols and their ethers, and other actively ionized acids may replace my preferred mixture, varying with the organism requiring control. The electric current or charge may be applied at such potential or in such a manner as effectively to secure penetration to and contact with the mold or rot organism by the combined fungicidal fluid.

Having thus described my invention, what I claim as new and desire to secure by Letters Patent is:

1. A process for the preservation of fruits or vegetables consisting of subjecting them to the action of a preservative fluid containing substantial amounts of ferrous sulphate and a water-soluble chemical agent intended to promote uniform wetting of any parasitic growth or organism present thereon.

2. A process for the preservation of fruits or vegetables consisting of subjecting them to the action of a preservative fluid containing substantial amounts of ferrous sulphate and an aliphatic alcohol.

3. A process for the preservation of fruits or vegetables consisting of subjecting them to the action of a preservative fluid containing substantial amounts of ferrous sulphate, an aliphatic alcohol, and a free acid capable of preventing the combination of the other ingredients with the organic salts contained in such fruits or vegetables.

4. A process for the preservation of fruits or vegetables consisting of subjecting them to the action of a preservative fluid containing substantial amounts of a fungicide containing an iron ion, an aliphatic alcohol, and a free acid capable of preventing the combination of any ions of the fungicide with the organic salts contained in such fruits or vegetables.

5. A process for the preservation of fruits or vegetables consisting of subjecting them to the action of an electric current carrying a fungicide and a water soluble wetting agent thereto or therein.

6. A process for the preservation of fruits or vegetables consisting in subjecting them to the action of electrically charged finely divided particles of a liquid fungicide applied to such fruits or vegetables.

7. A process for the preservation of fruits or vegetables consisting in subjecting them to electric cataphoresis while applying thereto a fungicide and a water soluble wetting agent in combined solution.

8. A process for the preservation of fruits or vegetables consisting in subjecting them to the action of a solution containing substantial amounts of a liquid fungicide and a wetting agent applied under the influence of a unidirectional high-frequency current.

9. A process for the preservation of fruits or vegetables consisting in subjecting them to the action of a solution containing substantial amounts of a liquid fungicide and a water soluble wetting agent, applied by means of electrically charged jets.

10. A process for the preservation of fruits or vegetables consisting in subjecting them to the action of a solution containing in substantial amounts ferrous sulphate and a water soluble wetting agent, such solution being applied in conjunction with an electric charge or current.

11. A process for the preservation of fruits or vegetables consisting in subjecting them to the action of a solution containing substantial amounts of ferrous sulphate, an aliphatic alcohol, and an acid ion capable of preventing dissociation of ferrous sulphate by organic acids, applied in conjunction with an electric charge or current.

12. A process for the preservation of fruits or vegetables consisting in subjecting them to the action of a solution containing ferrous sulphate, normal butyl alcohol, and sulphuric acid, in substantial amounts, applied in conjunction with an electric charge or current.

13. A process for the preservation of fruits or vegetables, consisting in subjecting them to the action of a solution containing substantial amounts of a fungicide containing an iron ion, a water soluble wetting agent, and an acid ion capable of preventing dissociation of such fungicide by organic acids, applied in conjunction with an electric charge or current.

In testimony whereof I affix my signature.

ANSEL S. WYSONG.